(12) United States Patent
Marteau-Lorant et al.

(10) Patent No.: US 10,371,224 B2
(45) Date of Patent: Aug. 6, 2019

(54) SPRING FOR A VEHICLE

(71) Applicant: Hendrickson Commercial Vehicle Systems Europe GmbH, Judenburg (AT)

(72) Inventors: Séverin Marteau-Lorant, Grand-Charmont (FR); Sébastien Brogly, Essert (FR)

(73) Assignee: Hendrickson Commerical Vehicle Systems Europe GmbH, Judenburg (AU)

( * ) Notice: Subject to any disclaimer, the term of this patent is extended or adjusted under 35 U.S.C. 154(b) by 0 days.

(21) Appl. No.: 15/533,464

(22) PCT Filed: Dec. 4, 2015

(86) PCT No.: PCT/EP2015/078681
§ 371 (c)(1),
(2) Date: Jun. 6, 2017

(87) PCT Pub. No.: WO2016/091752
PCT Pub. Date: Jun. 16, 2016

(65) Prior Publication Data
US 2017/0370436 A1  Dec. 28, 2017

(30) Foreign Application Priority Data
Dec. 9, 2014 (AT) ................................. 884/2014

(51) Int. Cl.
*F16F 1/18* (2006.01)
*F16F 1/22* (2006.01)
(Continued)

(52) U.S. Cl.
CPC ............... *F16F 1/185* (2013.01); *F16F 1/22* (2013.01); *F16F 1/36* (2013.01); *F16F 1/368* (2013.01);
(Continued)

(58) Field of Classification Search
CPC ...... F16F 1/185; F16F 1/36; F16F 1/22; B60G 2206/428; B60G 2202/11
See application file for complete search history.

(56) References Cited

U.S. PATENT DOCUMENTS 326,472 A * 9/1885 Armstrong ................ F16F 1/18
267/47
481,394 A   8/1892 Farrell
(Continued)

FOREIGN PATENT DOCUMENTS

DE   198411 C   5/1908
DE   389200 C   2/1924
(Continued)

OTHER PUBLICATIONS

Written Opinion of the International Search Authority for International Application No. PCT/EP2015/078681 dated Mar. 9, 2016.
(Continued)

*Primary Examiner* — Vishal R Sahni
(74) *Attorney, Agent, or Firm* — Cook Alex Ltd.

(57) ABSTRACT

A spring, in particular a flat spring (5), for use in connection with a vehicle, has a middle region (6) which has a curve with a first curve direction, as well as two edge regions (7). In an unladen state, the edge regions (7) each have a curve with a second curve direction and vertices (10), with the second direction of curve being opposed to the first direction of curve. The flat spring (5) has a vertex axis (11) running through the vertices (10) of the curves of the edge regions (7). End regions (8) of the edge regions (7) are tilted away from the vertex axis (11) toward the side of the vertex axis (11) on which the middle region (6) lies.

17 Claims, 5 Drawing Sheets

(51) Int. Cl.
*F16F 1/36* (2006.01)
*F16F 1/368* (2006.01)
*F16F 1/373* (2006.01)

(52) U.S. Cl.
CPC .......... *F16F 1/373* (2013.01); *B60G 2202/11* (2013.01); *B60G 2206/428* (2013.01); *B60G 2206/7101* (2013.01)

(56) References Cited

U.S. PATENT DOCUMENTS

| | | | | |
|---|---|---|---|---|
| 509,069 | A | * | 11/1893 | Burch ................. F16F 1/18 267/47 |
| 662,876 | A | | 11/1900 | Parfrey |
| 1,398,578 | A | | 11/1921 | Stewart |
| 3,580,347 | A | | 5/1971 | McGee |
| 4,667,921 | A | * | 5/1987 | De Goncourt ............ F16F 1/18 248/618 |
| 6,435,485 | B1 | | 8/2002 | Greco |
| 2002/0101012 | A1 | * | 8/2002 | Greco .................. F16F 1/185 267/36.1 |
| 2002/0153689 | A1 | | 10/2002 | Schroeder et al. |
| 2002/0167121 | A1 | | 11/2002 | Greco |
| 2007/0145656 | A1 | | 6/2007 | Svendsen et al. |
| 2011/0127753 | A1 | | 6/2011 | Griffin |

FOREIGN PATENT DOCUMENTS

| | | |
|---|---|---|
| FR | 653291 A | 3/1929 |
| SU | 1597460 A1 | 10/1990 |
| WO | WO 96/27507 A1 | 9/1996 |

OTHER PUBLICATIONS

International Search Report (German) downloaded from the World Intellectual Property Organization for Interntional Application No. PCT/EP2015/078681 dated Mar. 9, 2016.

International Search Report (English) downloaded from World Intellectual Property Organization for Interntional Application No. PCT/EP2015/078681 dated Mar. 9, 2016.

Austria Patent Office Search Report dated Dec. 1, 2015 for Austrian patent application No. 1A A 884/2014-1, 2 with machine translation.

* cited by examiner

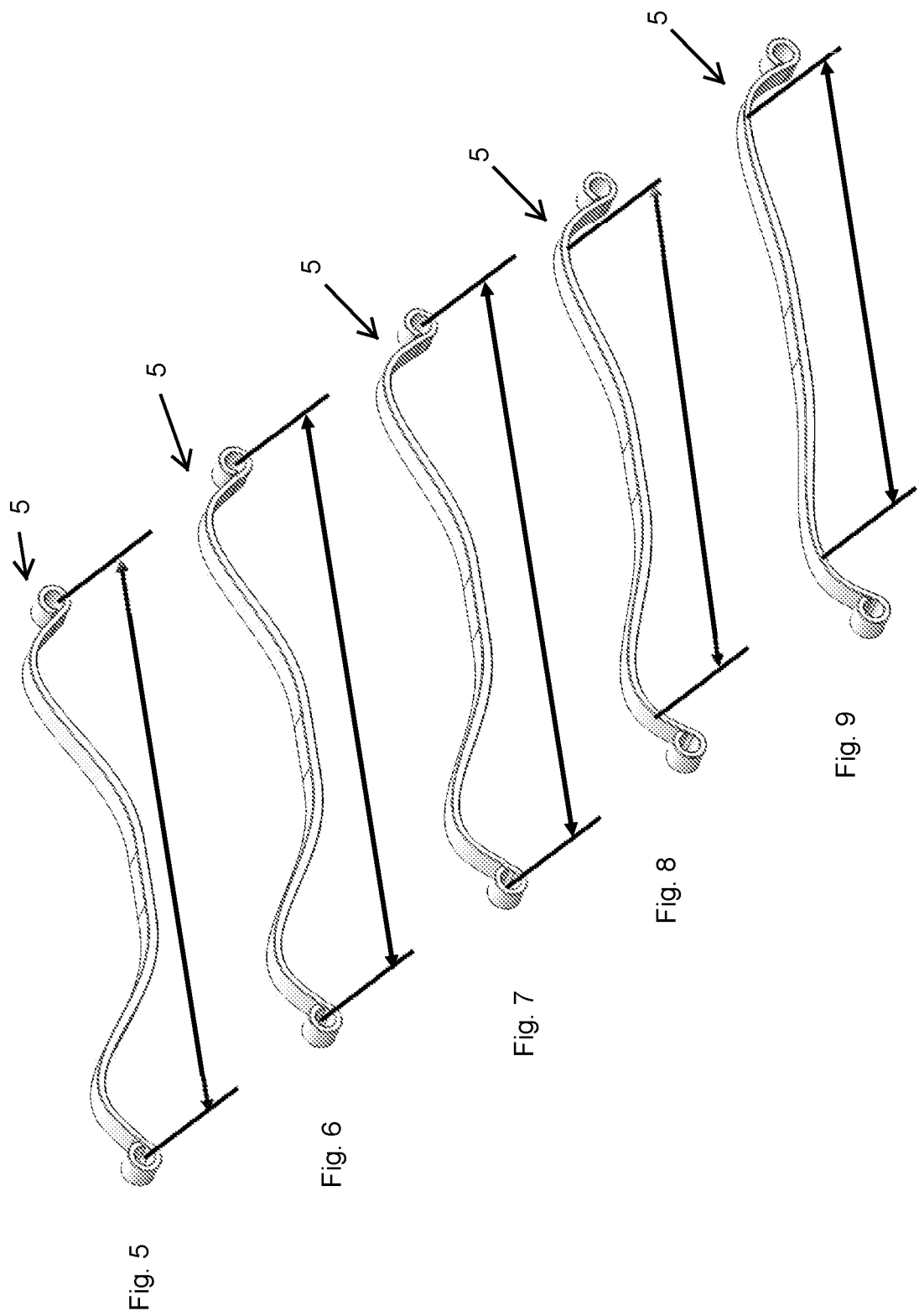

Figure 2:
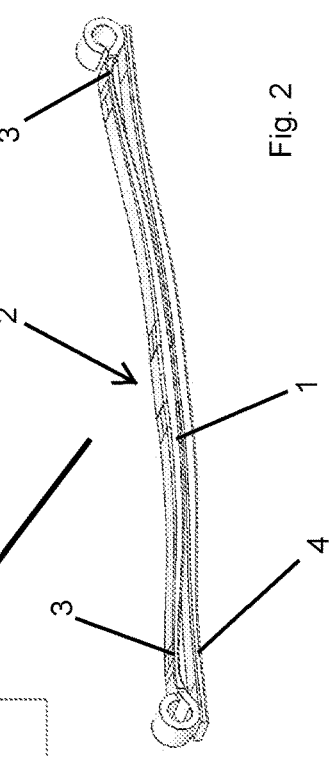
Figure 1:
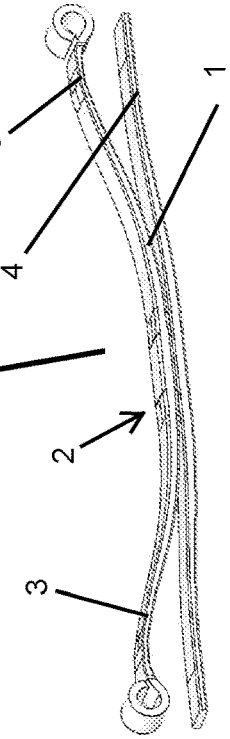

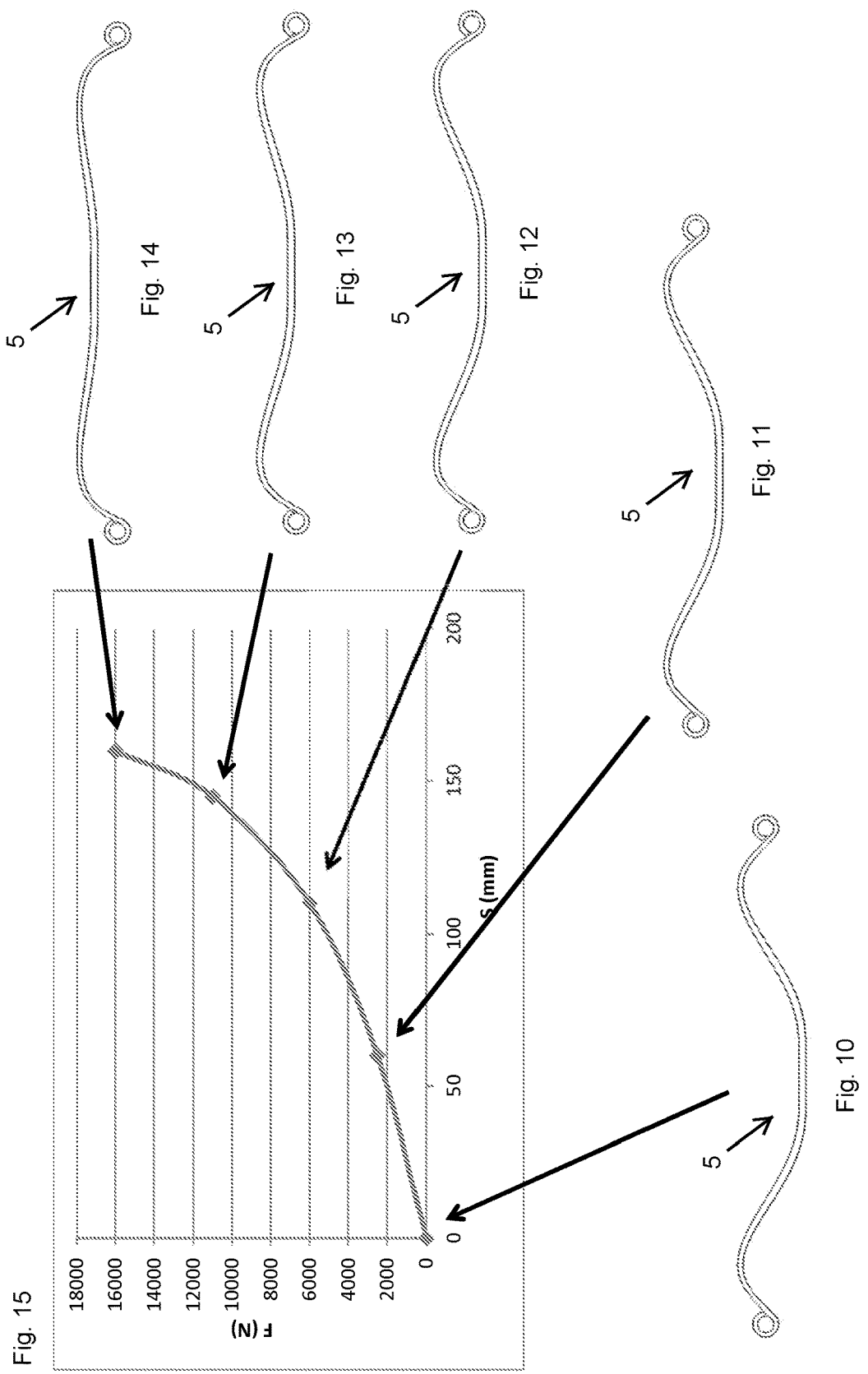

under a high load. FIGS. 1 and 2 show a two-part flat spring familiar from the state of the art in various load states. FIG. 1 corresponds

SPRING FOR A VEHICLE

CROSS-REFERENCE TO RELATED APPLICATIONS

The present application is a U.S. national stage application of International Patent Application No. PCT/EP2015/078681, filed Dec. 4, 2015, which claims the benefit of Austrian Patent Application No. A 884/2014, filed Dec. 9, 2014, both of which are incorporated by reference herein in their entireties.

The invention concerns a spring, in particular a flat spring, for use in connection with a vehicle, with a middle region which has a curve with a first curve direction, as well as two edge regions.

In automotive manufacturing, cushioning the wheels and the chassis of a vehicle with respect to one another is well established. Particularly for especially large and heavy vehicles, flat springs are used since a broad range of load requirements are covered by a simple construction form. In addition, flat springs can be serviced easily and are easily restored in case of breakage. Constructing flat springs in two parts, with a first part supporting lesser forces, for instance in unladen use or use with a low load, and with a second part acting as support, for instance with heavy loads of the vehicle equipped with the flat spring, is well established in the state of the art. Through this combination of two parts, a beneficial change in the spring characteristic curve is achieved. However, the transition when the second part of the spring becomes operative is abrupt, which negatively influences the driving quality of a vehicle which is equipped with such a two-part spring. The spring characteristic curve displays a knee which in particular negatively influences the driving quality of the vehicle.

In addition, such two-part flat springs have a much higher weight than one-piece designs, which negatively affects the energy consumption of a vehicle equipped with such a spring. Furthermore, the total weight of the vehicle rises, which leads to a reduction in the maximum permissible load.

To make the transition smoother, using multi-part flat springs rather than a two-part construction is well established in the state of the art. A truly progressive spring characteristic curve, on the one hand, is not achieved thereby. On the other hand, the known problems, which result from the high dead weight of the spring, are amplified.

Therefore, the object of the invention is to overcome the disadvantages described above.

This object is solved according to the invention by means of a spring of the type mentioned above, characterized in that, in an unladen state, the edge regions each display a curve with a second curve direction and vertices, with the second curve direction opposed to the first curve direction, in that the spring features a vertex axis which runs through the vertices of the curves of the edge regions, and in that end regions of the edge regions are slanted away from the vertex axis toward the side of the vertex axis, on which the middle region lies.

Due to the described geometry of the spring, the following advantages arise:

A spring constructed according to the invention can have a strongly nonlinear, in particular progressive, spring characteristic curve, which has positive effects on the driving quality of a vehicle which is equipped with a spring according to the invention.

Furthermore, material and weight of the entire suspension can be conserved when using a one-piece construction of the flat spring, which both makes construction less expensive and reduces the total weight of the vehicle.

This is achieved by functionally reducing the effective length of the flat spring under an increasing load.

In an especially preferred embodiment of the invention, it is envisioned that the edge regions are shaped symmetrically with regard to one another. The force exerted on the flat spring can thus be absorbed evenly. Alternatively, it can be envisioned that the edge regions are shaped a symmetrically with regard to one another. The flat spring can thus be constructed advantageously with regard to predetermined conditions, such as for example differently constructed chassis.

In addition, it is preferred within the scope of the invention, that the spring according to the invention contains spring steel and/or composite material. The composite material can include glass fibers, which are preferentially embedded in the synthetic material of the composite material as a reinforcing element. Additionally or alternatively, the composite material can feature thermosetting resin or thermoplastic resin. In particular, it can be envisioned that the composite material features polyurethane and/or polyamide and/or polyester.

It is preferred in particular if fibers, in particular glass fibers, are arranged on the surface of the spring, which essentially run parallel to the vertex axis, in particular from one edge region to the opposite edge region. Thus, the spring is further strengthened in spite its relatively low weight.

In a preferred embodiment, it is envisaged that at least one end region is tilted by an angle $\alpha$ away from the vertex axis toward the side of the vertex axis, on which the middle region lies, with the angle $\alpha$ lying between 1° and 135°, preferably in the range of 10° to 90°, especially preferably in the range of 20° to 60°, in particular 45°.

According to the invention, the use of a flat spring is recommended, in which a force vector exerted on the middle region is pointed toward the vertex axis and force vectors exerted on the end regions are pointed in the opposite direction.

In the scope of the invention, it is preferentially envisioned that the vertex axis lies above the middle region in an assembled state.

In addition, a vehicle with a spring according to the invention, which is in the preferred state of assembly, is suggested.

Additional preferred embodiments of the invention are the subject of the further sub-claims.

In the following, preferred embodiment examples of the invention are described in greater detail by means of the illustrations.

Figure 3:
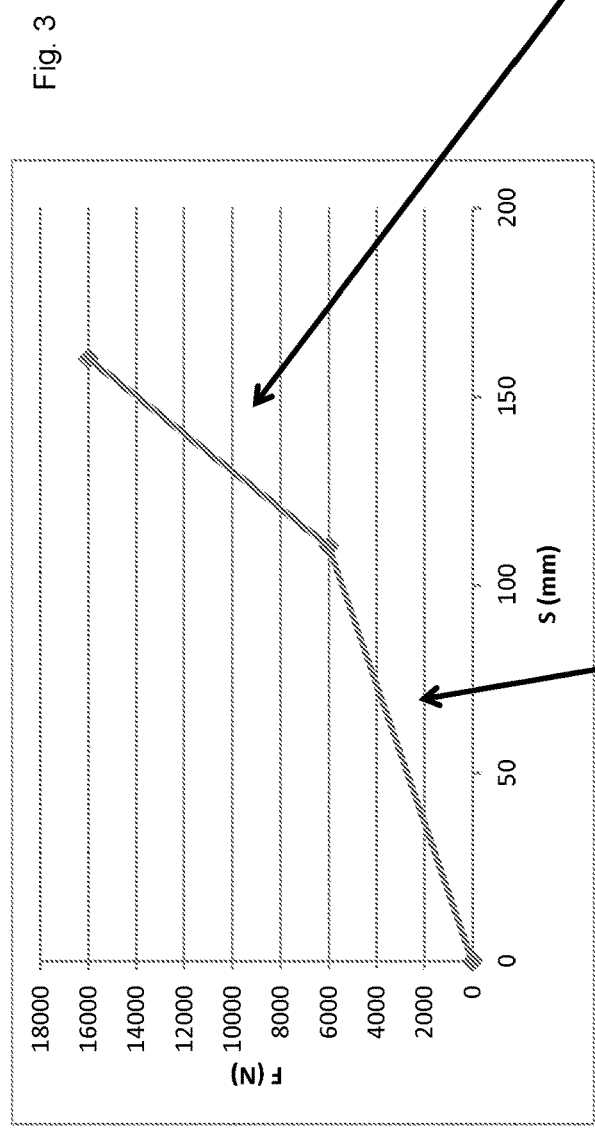
Figure 4:
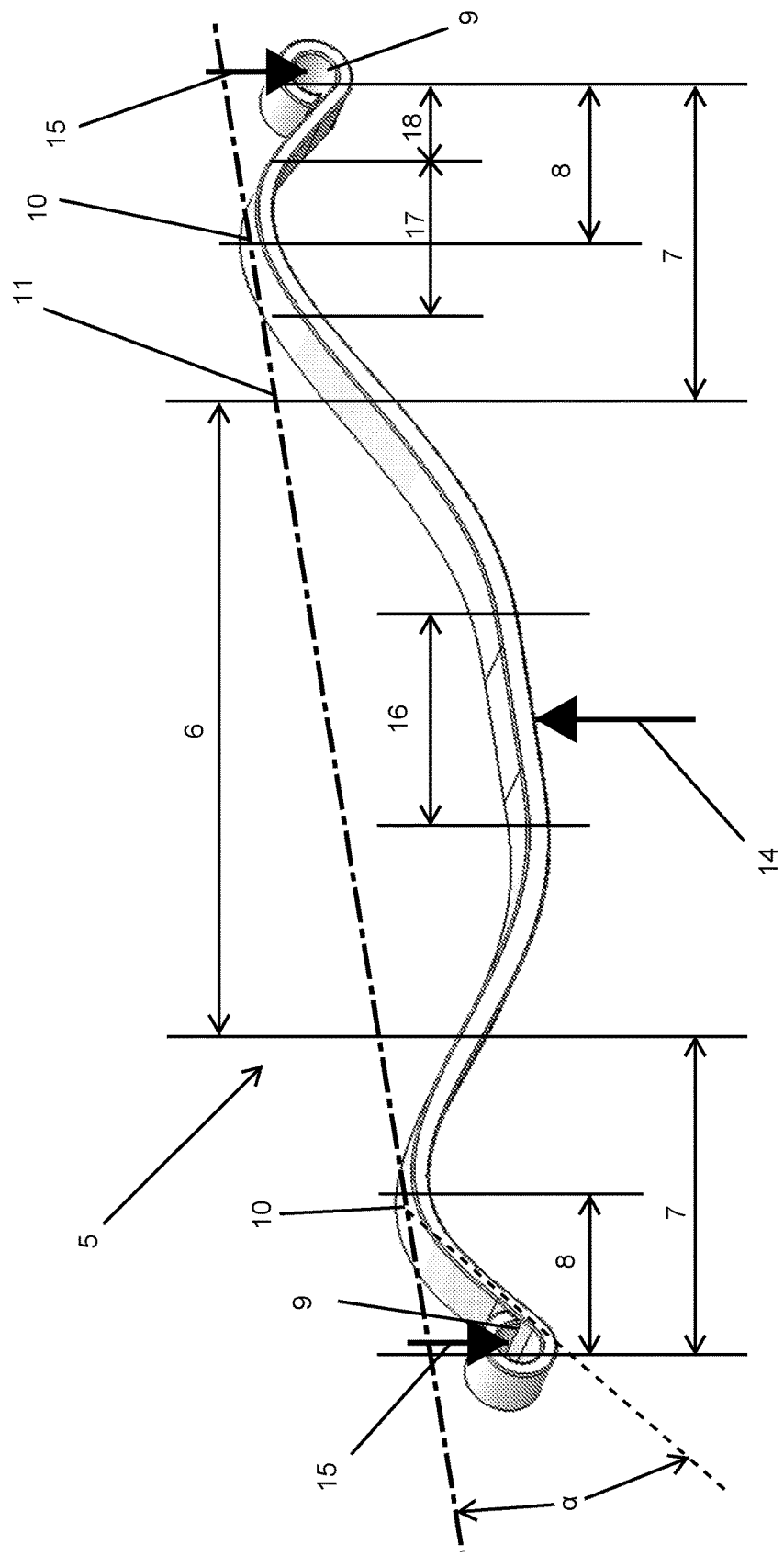

FIGS. 1 and 2 show a two-part flat spring according to the state of the art in various load states, FIG. 3 shows the spring characteristic curve of the flat spring according to FIGS. 1 and 2, FIG. 4 shows an embodiment of a one-piece flat spring according to the invention, FIGS. 5 to 14 show the flat spring according to FIG. 4 in various load states, FIG. 15 shows the spring characteristic curve according to FIGS. 10 through 14, FIG. 16 shows a use of the flat spring according to FIGS. 4 through 14, and FIG. 17 shows a further embodiment of a one-piece flat spring according to the invention.

FIGS. 1 and 2 show a two-part flat spring familiar from the state of the art in various load states. FIG. 1 corresponds to an essentially unladen state. The deformation of the flat spring 5 shown in FIG. 2 corresponds to a loaded state in which the vehicle is loaded.

The known flat spring comprises a first part of the spring 1 with a middle region 2 and two edge regions 3. The first part of the spring 1 is aligned in its middle region 2 with a second part of the spring 4. In an unladen state, the edge regions 3 are distanced from the second part of the spring 4. As the load increases, the two edge regions 3 approach the second part of the spring 4, up to the point where they abut the second part of the spring 4. Up to the point where the edge regions 3 abut the second part of the spring 4, a flat spring has a relatively flat, approximately linear spring characteristic curve, as shown in FIG. 3. The spring characteristic curve shows the connection between deformation (distance) of the flat spring and a force which acts on the flat spring. Upon further, increasing load, the first part of the spring 2 and the second part of the spring 4 are deformed together. From this point onward, the flat spring has a steeper, again approximately linear spring characteristic curve. The spring characteristic curve displays a bend which in particular negatively influences driving quality. The transition from a "soft" suspension to a "hard" suspension thereby is erratic. The spring rate drops intermittently with rising load. To make the transition smoother, using multi-part flat springs (for instance three-part of four-part) rather than a two-part construction is well established in the state of the art. A truly progressive spring characteristic curve, on the one hand, is not thereby achieved. On the other hand, the known problems are amplified by the high dead weight of the spring.

FIG. 4 shows an embodiment of a one-part flat spring 5 according to the invention. The flat spring 5 has a middle region 6 which has a curve with a first curve direction, as well as two edge regions 7, each with an end region 8. The middle region 6 has a base region 16 which essentially runs straight.

In an unladen state, the edge regions 7 each has a curve with a second curve direction and vertices 10, with the second curve direction opposed to the first curve direction. The flat spring 5 displays a virtual vertex axis 11 running through the vertices 10 of the curves of the edge regions 7, with the end regions 8 of the edge regions 7 tilted away from the vertex axis 11 to the side of the vertex axis 11, on which the middle region 6 lies. In the embodiment shown, the end regions 8 are tilted at an angle α of essentially 45° to the vertex axis 11. The end regions 8 display a curved section 17 and an essentially straight end section 18.

The end regions 8 each display a device 9 for connecting the flat spring 5 with a chassis of a vehicle, with these devices 9 being rolled eyes in the embodiment shown. For the flat spring 5 according to the invention, other devices 9 can also be envisioned for connecting the flat spring 5 with the chassis of a vehicle. Depending on the type of flat spring 5, both devices 9 can be an eye. A device 9 can also be a rolled or shaped eye, for instance incorporated in the end region 8, eye, whereas the other end region 8 can essentially be flat.

FIGS. 5 to 9 show how the flat spring 5 is deformed under an increasing load, beginning with FIG. 5 on to FIG. 9. An effective length 12 of the flat spring 5 is indicated, which becomes shorter beginning with FIG. 5 to FIG. 9, which leads to an increased gradient of the spring characteristic curve (FIG. 15), thus to a rising spring rate.

In FIG. 5 the flat spring 5 is shown in an essentially unladen state, with the effective length 12 of the flat spring 5 essentially being the length of the flat spring 5, since the flat spring 5 flexes significantly over its entire length under a load. Under an increasing load, the end regions 8 tilt more strongly toward the middle region 6, i.e. the end regions tilt more strongly away from the vertex axis 11. Due to the force vector applied there at a reduced angle with regard to the longitudinal direction of the end region, the bending moment becomes smaller in the end region, so that the end regions 8 flex less.

Thereby, the effective length 12 of the flat spring 5 is reduced, until it only has the length of the distance between the two vertices 10 in the state shown in FIG. 9. The reduction of the effective length 12 of the flat spring 5 in connection with the rising load results in a progressive spring characteristic curve. The spring rate also drops continuously under an increased load and dependent thereon.

Additionally, various points of the spring characteristic curve are marked in FIG. 15 which correspond to certain load states. These load states match corresponding formed or deformed, respectively, flat springs 5 according to FIGS. 10 to 14, with the load states according to FIGS. 10 to 14 corresponding to the depictions of the load states of the flat spring 5 according to FIGS. 5 to 9.

Figure 16:
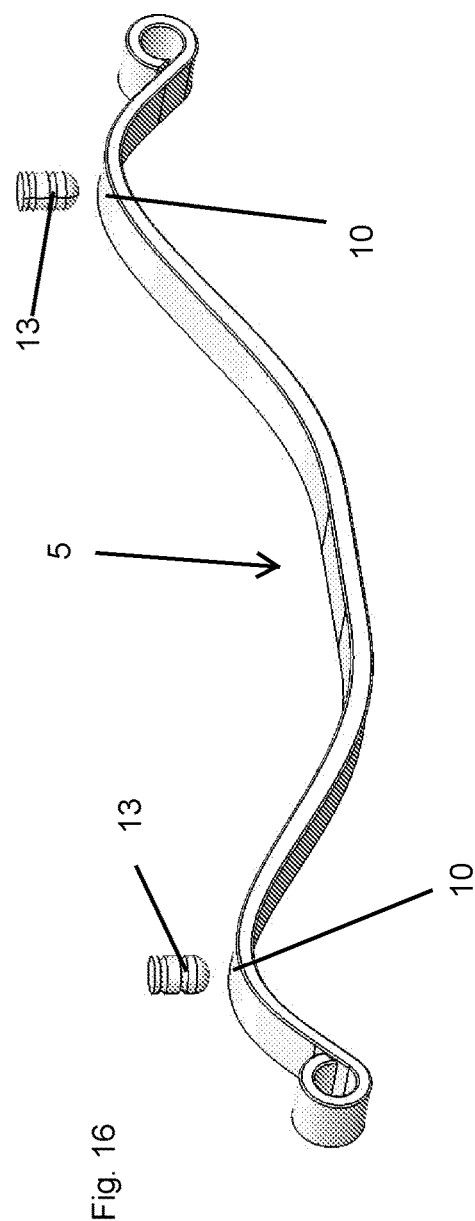

In FIG. 16, a use of the flat spring 5 according to the invention is shown, whereby it is indicated that the regions of the vertices 10 are associated with bump stops 13.

Figure 17:
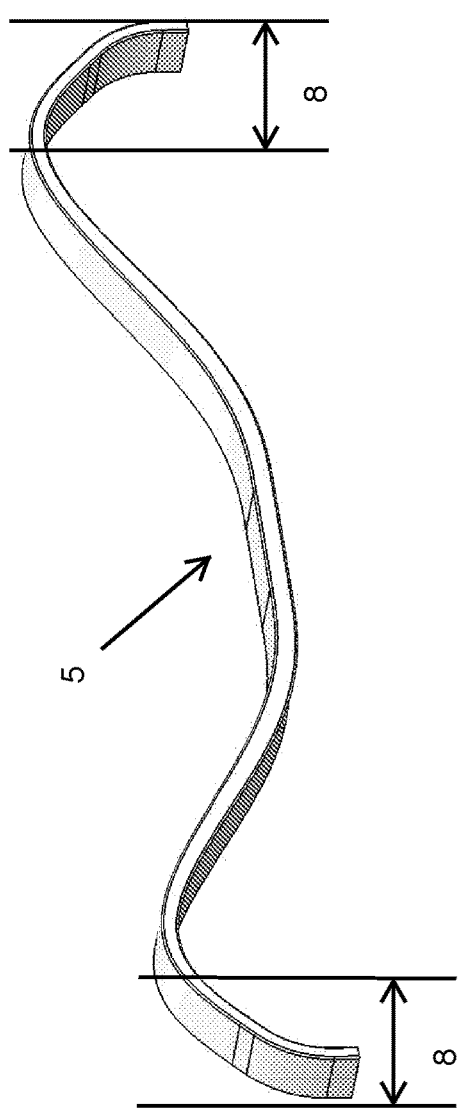

FIG. 17 shows an embodiment of a flat spring 5 according to the invention in which the device for connecting the flat spring 5 with the chassis of a vehicle are not rolled eyes 9. Rather, it is envisioned in this embodiment that the flat spring 5 is firmly connected with the chassis. This can be done with or without an intermediary piece, for instance through welding and/or by means of bolts.

All shown embodiments of flat springs 5 according to the invention have in common that a force vector 14 exerted on the middle region 6 (FIG. 4) is pointed toward the vertex axis 11, and force vectors 15 exerted on the end regions 8 point in the opposite direction.

The invention was described with reference to a flat spring. The technical effect according to the invention also occurs with other cross section types, for instance rod-like springs, so that the invention also extends to other forms than flat springs.

Summarizing, an example embodiment of the invention can be described as follows:

A spring, in particular a flat spring, for use in connection with a vehicle, has a middle region 6, which has a curve with a first curve direction, as well as two edge regions 7. In an unladen state, the edge regions 7 each have a curve with a second curve direction and vertices 10, with the second direction of curve being opposed to the first direction of curve. The flat spring 5 features a vertex axis 11 running through the vertices 10 of the curves of the end regions 7. End regions 8 of the edge regions 7 are tilted away from the vertex axis 11 toward the side of the vertex axis 11 on which the middle region lies.

The invention claimed is:

1. A spring, in particular a flat spring, for use in connection with a vehicle, with a middle region which has a curve with a first curve direction, as well as two edge regions, the middle region also having a base region which essentially runs straight and which provides a section for receiving an axle, the spring having a range of motion between an unladen state and a state of maximum load, wherein in an unladen state, the edge regions each have a curve with a second curve direction and vertices, with the second curve direction being opposed to the first curve direction, in that the flat spring has a vertex axis running through the vertices of the curves of the edge regions, and in that end regions of the edge regions are tilted away from the vertex axis toward the side of the vertex axis on which the middle region lies, wherein the spring is a one-piece flat spring and wherein during operation, the vertex axis lies above the middle region in an assembled state in that a force vector applied to the middle region is oriented toward the vertex axis and force vectors applied to the end regions point in the opposite direction, and in that the end regions each display a device for connecting the flat spring with a chassis of a vehicle, said device of each end region comprises a rolled or shaped eye, or is flat, and wherein under increasing load applied to the spring in the unladen state until achieving maximum load, the end regions tilt further away from the vertex axis and the middle region deflects over the range of motion of the spring in a direction towards the vertex axis, the middle region being furthest from the vertex axis in the unladen state and closest to the vertex axis in the state of maximum load.

2. The spring according to claim 1, wherein the edge regions are shaped symmetrically or asymmetrically with regard to one another.

3. The spring according to claim 1 further comprising, spring steel and/or composite material.

4. The spring according to claim 3, wherein the composite material features glass fibers, which are embedded in the synthetic material of the composite material as reinforcing elements.

5. The spring according to claim 4, wherein the composite material includes thermosetting resin or thermoplastic resin.

6. The spring according to claim 5, wherein the composite material features polyurethane and/or polyamide and/or polyester.

7. The spring according to claim 1, wherein fibers, in particular glass fibers, are arranged on the surface of the flat spring, which run essentially parallel to the vertex axis, in particular from one edge region to the opposite edge region.

8. The spring according to claim 1, wherein at least one end region is tilted by an angle (a) away from the vertex axis toward the side of the vertex axis, on which the middle region lies, with the angle ($\alpha$) lying between 1° and 135°.

9. A method of use of a spring according to 1, wherein a force vector applied to the middle region is oriented toward the vertex axis, and force vectors applied to the end regions point in the opposite direction.

10. A method of use of a spring according to claim 9, wherein the vertex axis lies above the middle region in an assembled state.

11. A vehicle characterized by at least one spring according to claim 1.

12. The spring according to claim 8, wherein the angle ($\alpha$) by which the at least one end region is tilted lies in the range of 10° to 90°.

13. The spring according to claim 8, wherein the angle ($\alpha$) by which the at least one end region is tilted lies in the range of 20° to 60°.

14. The spring according to claim 8, wherein the angle ($\alpha$) by which the at least one end region lies is approximately 45°.

15. The spring according to claim 1, wherein at maximum load, the effective length of the spring is defined by the distance between the vertices of the edge regions.

16. The spring according to claim 1, the effective length of the spring is defined by the distance between the vertices of the edge regions when the middle region has undergone maximum deflection in the direction of the vertex axis.

17. The spring according to claim 1, wherein in the unladen state, the base region of the middle region is vertically positioned at or below the end regions.

* * * * *